(12) United States Patent
Tang et al.

(10) Patent No.: US 11,051,182 B2
(45) Date of Patent: Jun. 29, 2021

(54) INFORMATION CONFIGURATION METHOD, APPARATUS, AND SYSTEM

(71) Applicant: HUAWEI TECHNOLOGIES CO., LTD., Guangdong (CN)

(72) Inventors: Xiaoyong Tang, Shenzhen (CN); Xiaona Wang, Chengdu (CN); Huang Huang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/522,945

(22) Filed: Jul. 26, 2019

(65) Prior Publication Data

US 2019/0349784 A1 Nov. 14, 2019

Related U.S. Application Data

(63) Continuation of application No. PCT/CN2017/113092, filed on Nov. 27, 2017.

(30) Foreign Application Priority Data

Jan. 26, 2017 (CN) .......................... 201710061848.9
Mar. 24, 2017 (CN) .......................... 201710184921.1

(51) Int. Cl.
*H04W 16/28* (2009.01)
*H04L 5/00* (2006.01)
(Continued)

(52) U.S. Cl.
CPC ........... *H04W 16/28* (2013.01); *H04L 5/0007* (2013.01); *H04L 5/0048* (2013.01); *H04L 41/08* (2013.01);
(Continued)

(58) Field of Classification Search
CPC ............ H04W 16/28; H04W 72/0446; H04W 72/046; H04W 72/082; H04W 72/085; H04L 5/0007; H04L 5/0048; H04L 41/08
See application file for complete search history.

(56) References Cited

U.S. PATENT DOCUMENTS

2013/0003788 A1* 1/2013 Marinier ................ H04B 7/024
375/219
2014/0079149 A1* 3/2014 Lee ...................... H04B 7/0417
375/267
(Continued)

FOREIGN PATENT DOCUMENTS

CN 102404689 A 4/2012
CN 102685795 A 9/2012
(Continued)

OTHER PUBLICATIONS

Extended European Search Report issued in European Application No. 17894072.2 dated Dec. 9, 2019, 8 pages.
(Continued)

*Primary Examiner* — Jael M Ulysse
(74) *Attorney, Agent, or Firm* — Fish & Richardson P.C.

(57) ABSTRACT

Example information configuration methods, apparatus, and systems are described. One example method includes generating first configuration information by a network device. The first configuration information includes at least one of the following information: receive beam indication information of a terminal device, reference signal sending and channel state information feedback period indication information, reference signal function indication information, or beam sweeping method indication information. The network device sends the first configuration information to the terminal device by using layer one or layer two signaling. The embodiments of the present invention provide a measure- (Continued)

ment information configuration solution when a narrow beam technology is used in a high-frequency band.

20 Claims, 6 Drawing Sheets

(51) Int. Cl.
*H04L 12/24* (2006.01)
*H04W 72/04* (2009.01)
*H04W 72/08* (2009.01)

(52) U.S. Cl.
CPC ..... *H04W 72/046* (2013.01); *H04W 72/0446* (2013.01); *H04W 72/082* (2013.01); *H04W 72/085* (2013.01)

(56) References Cited

U.S. PATENT DOCUMENTS

| | | | | |
|---|---|---|---|---|
| 2015/0004918 A1* | 1/2015 | Wang | ............... | H04W 48/16 455/73 |
| 2016/0021551 A1* | 1/2016 | Park | ............... | H04B 7/0619 370/328 |
| 2016/0036542 A1* | 2/2016 | Gong | ............... | H04B 17/345 370/329 |
| 2016/0037550 A1* | 2/2016 | Barabell | ............ | H04W 72/046 455/450 |
| 2016/0134352 A1* | 5/2016 | Stirling-Gallacher | ...................... | H04B 7/0639 370/329 |
| 2016/0226640 A1* | 8/2016 | Seol | ............... | H04B 7/0695 |
| 2017/0207843 A1* | 7/2017 | Jung | ............... | H04B 7/0695 |
| 2017/0207845 A1* | 7/2017 | Moon | ............... | H04B 7/0695 |
| 2017/0332359 A1* | 11/2017 | Tsai | ............... | H04B 7/0639 |
| 2018/0083680 A1* | 3/2018 | Guo | ............... | H04L 5/0048 |
| 2018/0227886 A1* | 8/2018 | Chou | ............... | H04W 72/046 |

FOREIGN PATENT DOCUMENTS

| | | |
|---|---|---|
| CN | 102740447 A | 10/2012 |
| CN | 106304120 A | 1/2017 |
| WO | 2015200009 A1 | 12/2015 |
| WO | 2016130960 A1 | 8/2016 |

OTHER PUBLICATIONS

Huawei et al., "WF on NR RS definition," 3GPP TSG RAN WG1 Meeting #86bis, R1-1610524; Lisbon, Portugal, Oct. 10-14, 2016, 4 pages.

Huawei et al., "CSI-RS design for beam management," 3GPP TSG RAN WG1 NR Ad-Hoc Meeting, R1-1700069; Spokane, USA, Jan. 16-20, 2017, 7 pages.

Intel Corporation et al., "WF on DL beam management," 3GPP TSG RAN1 #86 ,R1-168278; Gothenburg, Sweden, Aug. 22-26, 2016, 2 pages.

Intel et al., "WF on spatial QCL parameters for NR," 3GPP TSG-RAN WG1 #87, R1-1613108; Reno, USA, Nov. 14-18, 2016, 2 pages.

PCT International Search Report and Written Opinion issued in International Application No. PCT/CN2017/113092 dated Mar. 2, 2018, 18 pages (with English translation).

Zte et al., "On RS and CSI report settings," 3GPP TSG RAN WG1 NR Ad-Hoc Meeting, R1-1700128; Spokane, USA, Jan. 16-20, 2017, 6 pages.

* cited by examiner

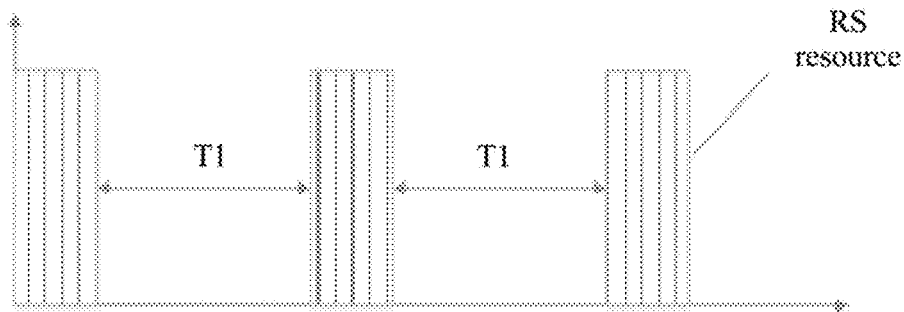
FIG. 4
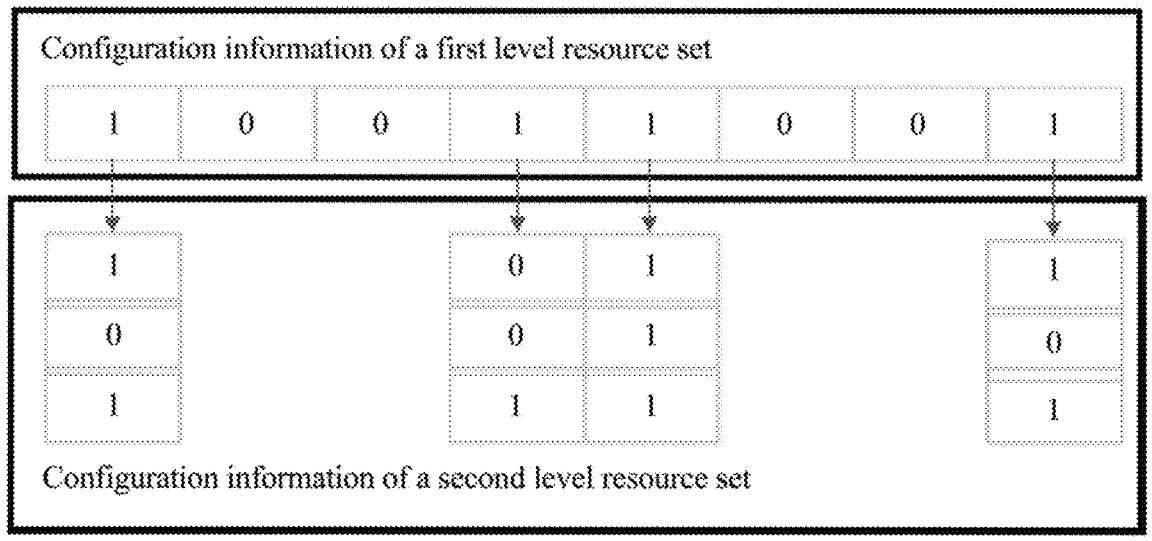
FIG. 5
FIG. 6

INFORMATION CONFIGURATION METHOD, APPARATUS, AND SYSTEM

CROSS-REFERENCE TO RELATED APPLICATIONS

This Application is a continuation of International Application No. PCT/CN2017/113092, filed on Nov. 27, 2017, which claims priority to Chinese Application No. 201710184921.1, filed on Mar. 24, 2017 and Chinese Application No. 201710061848.9, filed on Jan. 26, 2017. The disclosures of the aforementioned applications are hereby incorporated by reference in their entireties.

TECHNICAL FIELD

Embodiments of this application relate to the communications field, and more specifically, to a measurement information configuration method, apparatus, and system.

BACKGROUND

As low-band spectrum resources are under growing strain, a high frequency band (generally, a frequency band greater than 6 GHz is a high frequency band, and a frequency band less than 6 GHz is a low frequency band) becomes a main operating frequency band in 5G technologies due to abundant spectrum resources. During using of a high frequency band, because a path loss of an electromagnetic wave is large and anti-fading performance is poor in a data transmission process, a narrow beam analog weighting technology needs to be introduced.

A width of a narrow beam is generally less than 5 degrees, and with mobility of a terminal device and a time-varying characteristic of a channel, the narrow beams detected by the terminal device at different moments may be different. Therefore, a network device needs to configure different narrow beam measurement information for a same terminal device at different moments. Then, the terminal device measures the narrow beam based on the received narrow beam measurement information and feeds back current channel state information of the narrow beam.

In the prior art, in a Long Term Evolution (LTE) technology and a Long Term Evolution Advanced (LTE-A) technology, generally, all analog weighting beams are assumed to be wide beams and can cover an entire serving cell. Therefore, when a terminal device moves within the cell, a network device does not need to dynamically change measurement information of a reference signal. This method is obviously no longer suitable for reference signal measurement and feedback based on analog narrow beams in a 5G technology.

The technical problem to be resolved in the present invention is how to perform measurement based on a narrow beam channel in a timely and accurate manner for a narrow beam analog weighting technology used in a high-frequency band.

SUMMARY

To resolve the foregoing problems, the embodiments of this application provide an information configuration method, apparatus, and system.

According to a first aspect, an embodiment of the present invention provides an information configuration method, and the method includes: generating first configuration information, where the first configuration information includes at least one of the following information:

receive beam indication information of a terminal device, reference signal RS sending and channel state information CSI feedback period indication information, RS activation or deactivation indication information, RS sending and CSI feedback time offset indication information, RS function indication information, and beam sweeping method indication information; and sending the first configuration information to the terminal device by using layer 1 or layer 2 signaling;

wherein the receive beam indication information of the terminal device is used to indicate the receive beam of the terminal device;

the RS sending and feedback period indication information is used to indicate a sending period and feedback period of the RS resource;

the RS function indication information is used to indicate the RS is used for channel state information measurement or interference measurement or beam management;

the beam sweeping method indication information is used to indicate the beam sweeping method of the terminal device.

According to a second aspect, an information configuration method is provided, including:

receiving first configuration information from a network device, where the first configuration information includes at least one of the following information:

receive beam indication information of a terminal device, reference signal RS sending and channel state information CSI feedback period indication information, RS activation or deactivation indication information, RS sending and CSI feedback time offset indication information, RS function indication information, and beam sweeping method indication information; and performing channel measurement or interference measurement based on the first configuration information;

wherein the receive beam indication information of the terminal device is used to indicate the receive beam of the terminal device;

the RS sending and feedback period indication information is used to indicate a sending period and feedback period of the RS resource;

the RS function indication information is used to indicate the RS is used for channel state information measurement or interference measurement or beam management;

the beam sweeping method indication information is used to indicate the beam sweeping method of the terminal device.

According to a third aspect, an embodiment of the present invention further provides an information configuration method, including:

dividing configuration information into first configuration information and second configuration information;

sending the first configuration information to a terminal device by using RRC signaling; and sending the second configuration information to the terminal device by using a MAC CE or DCI, where the first configuration information includes one or more of: a CSI-RS basic pattern, a quantity of OFDM symbols used for reference signal transmission, time-frequency location information of OFDM used for RS transmission, or a CSI-RS sending period.

According to a fourth aspect, an embodiment of the present invention further provides an information configuration method, including:

receiving first configuration information from a network device;

receiving second configuration information from a transmitter; and performing measurement and feedback based on the first configuration information and the second configuration information, where the first configuration information includes one or more of: a CSI-RS basic pattern, a quantity of OFDM symbols used for reference signal transmission, time-frequency location information of OFDM used for RS transmission, or a CSI-RS sending period.

According to a fifth aspect, an embodiment of the present invention provides a network device, including a processor and a transceiver, and the processor is configured to generate first configuration information, where the first configuration information includes at least one of the following information:

receive beam indication information of a terminal device, reference signal RS sending and channel state information CSI feedback period indication information, RS activation or deactivation indication information, RS sending and CSI feedback time offset indication information, RS function indication information, and beam sweeping method indication information; and the transceiver is configured to send the first configuration information to the terminal device by using layer 1 or layer 2 signaling;

wherein the receive beam indication information of the terminal device is used to indicate the receive beam of the terminal device;

the RS sending and feedback period indication information is used to indicate a sending period and feedback period of the RS resource;

the RS function indication information is used to indicate the RS is used for channel state information measurement or interference measurement or beam management;

the beam sweeping method indication information is used to indicate the beam sweeping method of the terminal device.

According to a sixth aspect, an embodiment of the present invention further provides a terminal device, including a transceiver and a processor, where the transceiver is configured to receive first configuration information from a network device, where the first configuration information includes at least one of the following information:

receive beam indication information of a terminal device, reference signal RS sending and channel state information CSI feedback period indication information, RS activation or deactivation indication information, RS sending and CSI feedback time offset indication information, RS function indication information, and beam sweeping method indication information; and the processor is configured to perform channel measurement or interference measurement based on the first configuration information;

wherein the receive beam indication information of the terminal device is used to indicate the receive beam of the terminal device;

the RS sending and feedback period indication information is used to indicate a sending period and feedback period of the RS resource;

the RS function indication information is used to indicate the RS is used for channel state information measurement or interference measurement or beam management;

the beam sweeping method indication information is used to indicate the beam sweeping method of the terminal device.

According to a seventh aspect, an embodiment of the present invention provides a network device, including a processor and a transceiver, where the processor is configured to divide configuration information into first configuration information and second configuration information; and the transceiver is configured to send the first configuration information to a terminal device by using RRC signaling, and send the second configuration information to the terminal device by using a MAC CE or DCI.

According to an eighth aspect, an embodiment of the present invention provides a terminal device, including a processor and a transceiver, where the transceiver is configured to: receive first configuration information from a network device, and receive second configuration information from a transmitter; and the processor is configured to perform measurement and feedback based on the first configuration information and the second configuration information.

Another aspect of the present invention provides a communications system, including a network device and a terminal device. The network device is the network device according to the fifth or the seventh aspect, and the terminal device is the terminal device according to the sixth or the eighth aspect.

The embodiments of the present invention provide a measurement information configuration solution when a narrow beam technology is used in a high-frequency band.

BRIEF DESCRIPTION OF DRAWINGS

FIG. 4 is a schematic diagram of a pilot resource sending time offset according to an embodiment of the present invention;

FIG. 5 is a schematic diagram of a bitmap;

FIG. 6 is a schematic diagram of another bitmap;

DESCRIPTION OF EMBODIMENTS

The following describes the technical solutions in the embodiments of this application with reference to the accompanying drawings.

Figure 1:
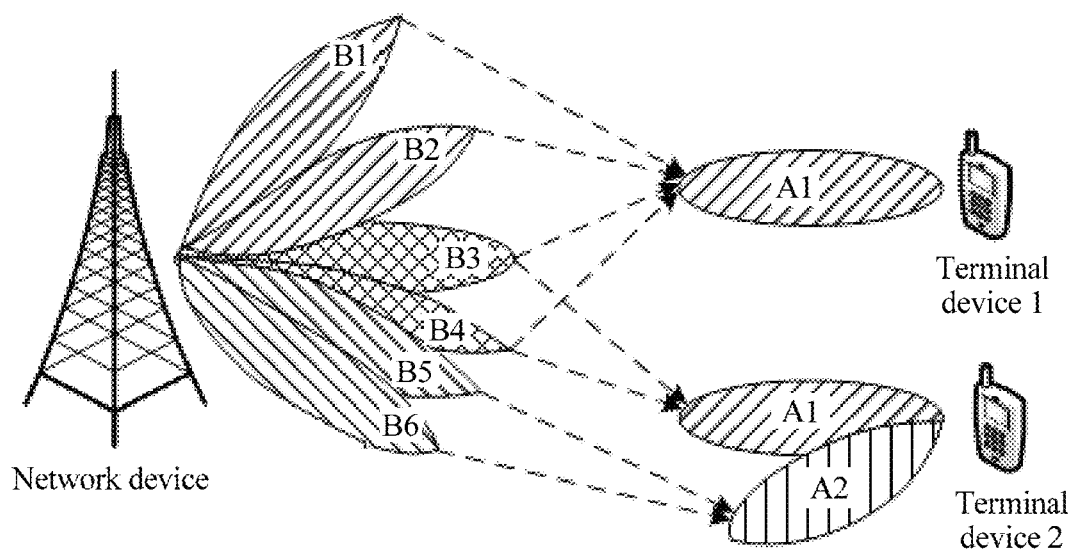
FIG. 1 is a schematic diagram of an application scenario of a technical solution according to an embodiment of this application.

FIG. 1 is a schematic diagram of an application scenario of a technical solution according to an embodiment of this application. As shown in FIG. 1, a network device has six different transmit beams B1-B6 on a radio frequency channel, and different analog weighting processing is performed on the six same or different beams. As a receive end of the radio frequency channel, a terminal device 1 has one beam A1. As a receive end of the radio frequency channel, a terminal device 2 has two beams A1 and A2. Beam pair information between the network device and the terminal device 1 is established by using B1-B4 and A1 for communication between the network device and the terminal device 1. Beam pair information between the network device and the terminal device 2 is established by using B5-B6 and A1-A2 for communication between the network device and the terminal device 2. It should be understood that this application is applied to any communication between a network device and a terminal device based on analog beam weighting.

It should be understood that, the technical solutions in the embodiments of this application may be applied to various communications systems, such as a Global System for Mobile Communications ("GSM" for short) system, a Code Division Multiple Access ("CDMA" for short) system, a Wideband Code Division Multiple Access ("WCDMA" for short) system, a Long Term Evolution ("LTE" for short) system, an LTE frequency division duplex ("FDD" for short) system, an LTE time division duplex ("TDD" for short) system, a Universal Mobile Telecommunications System ("UMTS" for short), and a $5^{th}$ generation ("5G" for short) communications system.

The embodiments are described with reference to a terminal device in this application. The terminal device may also refer to user equipment ("terminal device" for short), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol ("SIP" for short) phone, a wireless local loop ("WLL" for short) station, a personal digital assistant ("PDA" for short), a handheld device having a wireless communication function, a computing device, another processing device connected to a wireless modem, an in-vehicle device, a wearable device, a terminal device in a future 5G network, a terminal device in a future evolved public land mobile network ("PLMN" for short), or the like.

The embodiments are described with reference to a network device in this application. The network device may be a device configured to communicate with the terminal device. For example, the network device may be a combination of a base transceiver station ("BTS" for short) and a base station controller ("BSC" for short) in a GSM or CDMA system, or may be a NodeB ("NB" for short) or a radio network controller ("RNC" for short) in a WCDMA system, or may be an evolved NodeB ("eNB" or "eNodeB" for short) in an LTE system; or the network device may be a relay station, an access point, an in-vehicle device, a wearable device, an access network device in a 5G network, for example, a next generation base station, a transmission reception point (TRP), an access network device in a future evolved PLMN network, or the like.

A basic principle of the embodiments of the present invention is as follows: In a high-frequency communications system (a frequency band greater than 6 GHz), to receive and send a reference signal or data by using an analog narrow beam, a time-frequency resource or port information of the reference signal needs to be associated with a receive beam or a transmit beam on a receiving side. In this way, the receiving side can obtain a receive beam or transmit beam that is specifically used to receive or send the reference signal or the data. The association information needs to be configured for the receiving side before the reference signal or the data is sent. After obtaining the configuration information, the receiving side can receive the specific reference signal or data by using a correct receive beam.

Figure 2A:
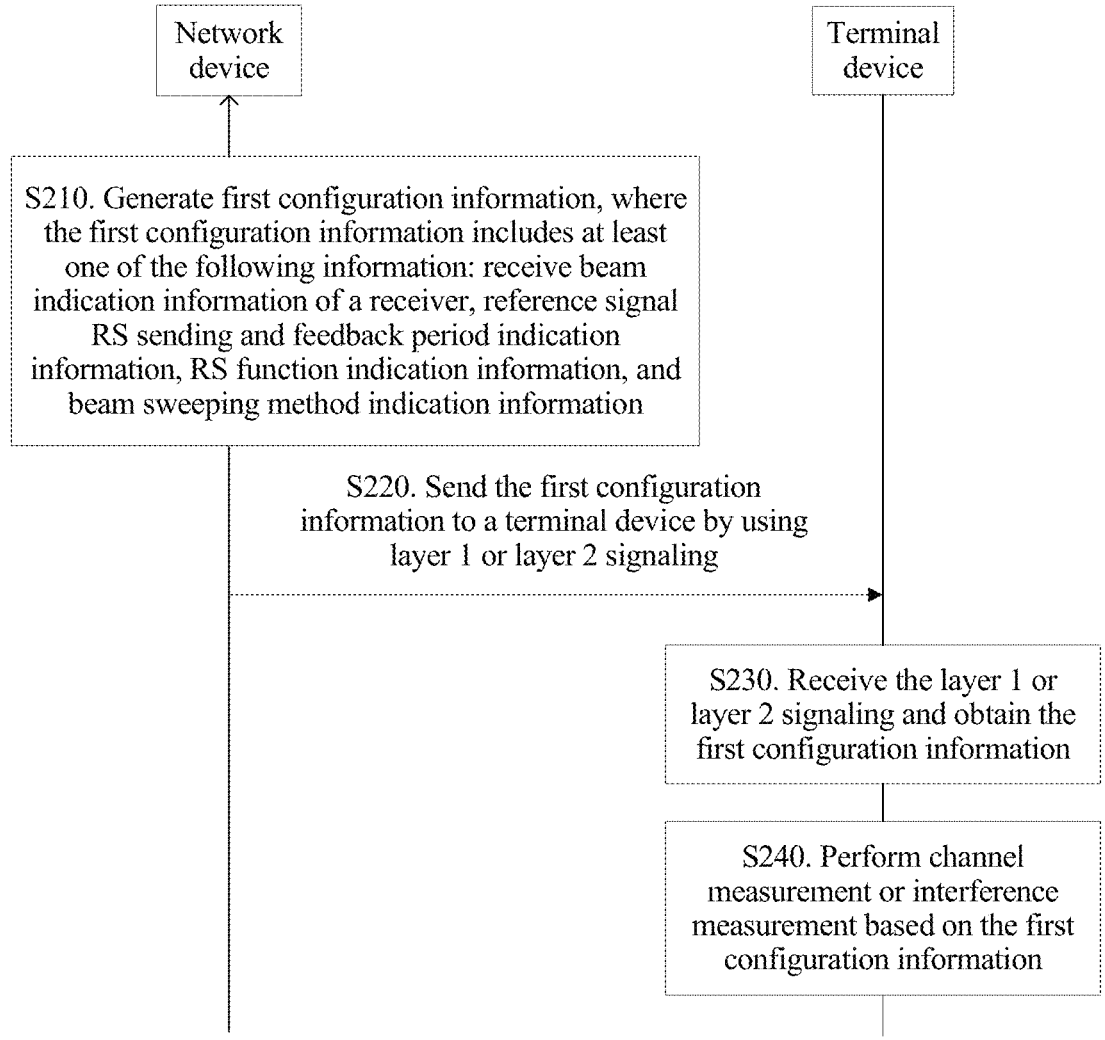
FIG. 2A is a schematic flowchart of an information configuration method according to an embodiment of this application.

FIG. 2A shows a schematic flowchart of an information configuration method 200 according to an embodiment of this application.

S210. A network device generates first configuration information, where the first configuration information includes at least one of the following information:

receive beam indication information of a terminal device, reference signal RS sending and feedback period indication information, RS function indication information, and beam sweeping method indication information.

S220. Send the first configuration information to the terminal device by using layer 1 or layer 2 signaling.

S230. The terminal device receives the layer 1 or layer 2 signaling and obtains the first configuration information.

S240. Perform measurement or beam management based on the first configuration information.

The layer 1 signaling is downlink control information (downlink control information, DCI).

The layer 2 signaling is a Media Access Control control element (media access control control element, MAC CE).

Optionally, the first configuration information further includes the following information:

RS activation or deactivation indication information, and RS sending and feedback time offset indication information.

Before step S210, the method 200 further includes:

S201. The network device generates second configuration information and sends the second configuration information to the terminal device, where the second configuration information may be referred to as a measurement setting (measurement setting).

Figure 2B:
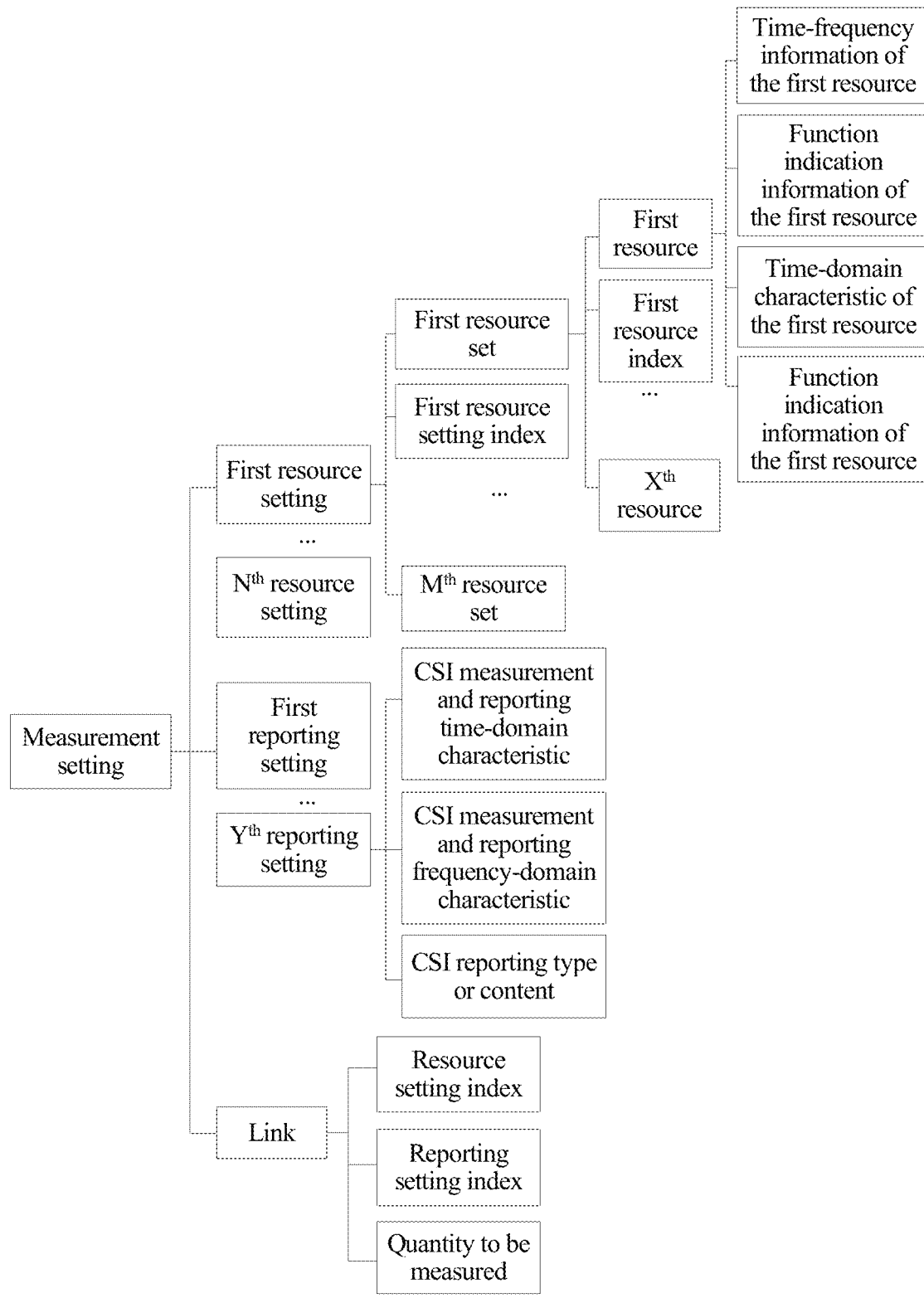
FIG. 2B is a schematic diagram of a second configuration resource according to an embodiment of the present invention.

The second configuration information may include one or more of the following information:

one or more resource settings, one or more reporting settings, or a link. As shown in FIG. 2B, FIG. 2B shows a schematic diagram of the measurement setting. M, N, X, and Y in FIG. 2B are all integers greater than 1.

Each RS resource setting is corresponding to one resource setting index that is used to uniquely identify the resource setting.

Optionally, the second configuration information should be sent before or when the first configuration information is sent.

Further, each resource setting includes one or more RS resource sets and a resource type. The resource type is used to identify a function or a purpose of the reference signal resource. For example, when the resource type is a first value, the resource type is used to indicate that the reference signal is used for beam management; when the resource type is a second value, the resource type is used to indicate that the reference signal is used for channel state information acquisition.

Further, each RS resource set is corresponding to one resource set index that is used to uniquely identify the resource set.

Further, each RS resource set includes one or more RS resources, and each RS resource is corresponding to one resource index that is used to uniquely identify the resource.

Further, each RS resource includes one or more of the following information:

time-domain resource information of each RS, an RS sending time-domain behavior, or RS function indication information. The function indication information is used to indicate a function of the RS. For example, when the indication information is a first value, the RS is used for interference measurement (IM). When the indication information is a second value, the RS is used for channel state measurement. When the indication information is a third value, the RS is used for beam management (BM).

Optionally, the RS function indication information may be power information. For example, a field or a line is newly added to power information provided in the existing LTE to identify a function of an RS. When a value of the RS function indication information is zero or null, the RS is used for interference measurement. When a value of the RS function indication information is another value, the RS is of non-zero power and is used for channel estimation.

Further, time-domain resource information of each RS includes one or more of the following information: a quantity of OFDM symbols occupied by the RS, location information of each OFDM symbol in a subframe, a quantity of RS ports on one OFDM symbol, or mapping information of a resource element (RE) (mapping to REs). The information is mainly used to notify a receiver of time-frequency locations of the RS, and the receiving side can measure the RS based on the information.

Specifically, the time-domain behavior may be periodic, aperiodic, and semi-persistent. A periodic time-domain behavior is that a reference signal measurement resource configured by a base station periodically appears in time. A semi-persistent time-domain behavior is that a reference signal measurement resource configured by a base station periodically appears within specified duration, and may not be limited beyond the specified duration. An aperiodic time-domain behavior is that a base station configures a temporary reference signal measurement resource for user equipment. When the base station indicates a periodic time-domain behavior, generally, specific duration of one period needs to be indicated. For example, 50 ms is one period and 100 ms is one period. The time-domain behavior is mainly used to notify a receiver of a period, frequency, or time at which a transmitter transmits reference signals, so that the receiver can receive the reference signals.

Each CSI reporting setting is corresponding to one reporting setting index that is used to uniquely identify the reporting setting.

Each reporting setting includes at least one of the following content:

a reporting beam management (BM) parameter, a CSI type, codebook configuration information such as a codebook subset restriction, a time-domain behavior, a frequency-domain granularity, and measurement restriction configuration.

The reporting setting is used to indicate information fed back by the receiver to the transmitter, and how to feed back the information, or feedback frequency or a feedback period.

The reporting beam management parameter may include one or more of: a resource set index; a resource set index and a resource index; a resource set index and an RS port index; a resource set index, a resource index, and an RS port index; a resource index; a resource index and an RS port index; or an RS port index.

The frequency-domain granularity is information about a subcarrier corresponding to one or more RS measurement resources in frequency domain, or may be information such as a subcarrier sequence number, a subcarrier width, or a subcarrier spacing corresponding to a subcarrier in one or more resource blocks (RB).

Optionally, the RS is a CSI-RS. The CSI-RS is a downlink reference signal used when channel state measurement, for example, channel quality information (CQI), a precoding matrix indicator (PMI), a rank indicator (RI), or beam management is performed. A CSI-RS measurement resource is a time-frequency resource configured by the base station for a CSI-RS, and is used by the base station to perform beam alignment with the terminal device. In a beam alignment process, the base station can send the CSI-RS on the CSI-RS measurement resource, and the terminal device can receive and measure, on the CSI-RS measurement resource, the CSI-RS sent by the base station.

Optionally, the first configuration information may be sent to the terminal device by using a random access response message or a physical downlink shared channel (PDSCH) after the terminal device completes random access.

Optionally, the RS is a sounding reference signal (SRS). The SRS is an uplink reference signal used for channel estimation or beam management. An SRS measurement resource is a time-frequency resource configured by the base station for an SRS, and is used by the base station to perform beam alignment with the terminal device. In a beam alignment process, the terminal device can send the SRS on the SRS measurement resource, and the base station can receive and measure, on the SRS measurement resource, the SRS sent by the terminal device.

Optionally, the first configuration information may be sent to the terminal device by using a random access response message or a physical downlink shared channel (PDSCH) after the terminal device completes random access.

Specifically, the link is used to indicate a quantity to be measured and a correspondence between a resource setting and a reporting setting. One reporting setting may be associated with one or more resource settings. A plurality of reporting settings may be associated with one resource setting.

The link includes a resource setting index or indication, a reporting setting index or indication, and a quantity to be measured. For example, a resource setting index 1 is in a one-to-one correspondence with a reporting setting index 2. When the RS resource configured by the network device belongs to resources in the resource setting index 1, the terminal device needs to perform reporting according to a requirement of the reporting setting index 2 when feeding back the RS measurement information.

Further, the link may further include a beam sweeping type. The beam sweeping type is used to indicate sweeping manners of the network device and the terminal device. As specified in the current standard, three downlink sweeping modes and three uplink sweeping modes, namely, P1/P2/P3 and U1/U2/U3 respectively are agreed in the standard. For example, for downlink pilot configuration, there may be two bits in a beam sweeping type field. For example, 01 indicates sweeping in a P2 manner. For meanings of P1, P2, P3, U1, U2, and U3, refer to a definition in the standard, and details are not described herein.

Specifically, in step 210, in the first configuration information, the receive beam indication information of the terminal device may be receive beam information used to indicate one or more reference signal ports, receive beam information used to indicate one or more reference signal resources, receive beam information used to indicate a resource set, or receive beam information used to indicate a resource setting. The RS port in the present invention is used to indicate a time-frequency location of the reference signal in an OFDM symbol, and is not a physical port.

Further, receive beam indication information of the terminal device may be a transmit beam index, a receive beam index, a beam pair index (used to describe a transmit beam and a receive beam), a quasi-co-located (QCL) index or a QCL indicator used to indicate beam information, and any combination of the foregoing several indexes.

When the network device indicates that the receive beam information of the terminal device is a beam pair index, it should be understood that, before the indication, the terminal device first feeds back beam information to the network device, and the network device indicates the receive beam pair (BPL: Beam pair link) information of the terminal device based on the beam information fed back by the terminal device.

Further, the terminal device may specifically feed back beam information of one of or a combination of any two or more of the following information:

a group index group ID, a receive beam ID, and a transmit beam ID.

The group ID may be one of or a combination of any two or more of the following information: first information and second information.

The first information is group information obtained according to a predefined or preconfigured rule, and the rule includes but is not limited to antenna grouping and antenna panel grouping. For example, beams formed by ports on a same antenna panel are in a same group.

The second information includes but is not limited to logical beam ID information, logical group ID information, and bitmap-based logical beam information.

The transmit beam ID may be one of or a combination of more pieces of information of a resource setting index, a resource set index, a resource index, a port index, a time index, and a synchronization block SS block index.

The receive beam ID may be a logical ID of a receive beam of the terminal device. For example, as shown in the following table, the logical ID may be global logical numbers of all beams selected by the terminal device, or may be local logical numbers of all beams corresponding to the group ID. It should be further understood that receive beams corresponding to a same group may be received or sent on the terminal device side at the same time.

| Information about receive beams selected by the terminal device | Global logical number | Local logical number |
|---|---|---|
| 4 | 0 | Group #0: 0 |
| 5 | 1 | Group #0: 1 |
| 9 | 2 | Group #1: 0 |
| 12 | 3 | Group #1: 1 |

When the network device indicates that the receive beam information of the terminal device is a beam pair index (BPL: Beam pair link), the beam pair index information may be one of or a combination of more pieces of the following information:

first indication information that is used to indicate beam pair index types corresponding to different types or functions or processes;

second indication information that is group index group ID information;

third indication information that is a logical ID or bitmap information of a transmit beam; or fourth indication information that is a logical ID or bitmap information of a receive beam.

The first indication information may be different types of reference signals, and includes but is not limited to an initial access reference signal, a beam management reference signal, a CSI measurement reference signal, and a data transmission reference signal. Alternatively, the first indication information may be different communication processes, and includes but is not limited to an initial access phase, a beam management phase, a CSI measurement phase, and a data transmission phase. For example, the first indication information is of 2 bits. 00 represents the initial access reference signal, 01 represents the beam management reference signal, 10 represents the CSI measurement reference signal, and 11 represents the data transmission reference signal.

The second indication information is a group ID. A representation form of the group ID may be one of or a combination of any two or more of the following information: first information and second information.

The first information is group information obtained according to a predefined or preconfigured rule, and the rule includes but is not limited to antenna grouping and antenna panel grouping. For example, beams formed by ports on a same antenna panel are in a same group.

The second information includes but is not limited to logical beam ID information, logical group ID information, and bitmap-based logical beam information.

The third indication information is a logical ID of a transmit beam or indicates a beam index in a bitmap manner. For example, in the following table:

| Beam information fed back by the terminal device | Logical ID | Bitmap information |
|---|---|---|
| 4 | 0 | [1, 1, 0, 1], 1 indicates that |
| 5 | 1 | the transmit beam is selected, |
| 9 | 2 | and 0 indicates that the |
| 12 | 3 | transmit beam is not selected. |

The fourth indication information is a logical ID of a receive beam or indicates beam index information in a bitmap manner. For example, as shown in the following table, the logical ID may be global logical numbers of all beams selected by the terminal device, or may be local logical numbers of all beams corresponding to the group ID. It should be further understood that receive beams corresponding to a same group may be received or sent on the terminal device side at the same time.

| Beam information selected by the terminal device | Global logical number | Local logical number |
|---|---|---|
| 4 | 0 | Group #0: 0 |
| 5 | 1 | Group #0: 1 |
| 9 | 2 | Group #1: 0 |
| 12 | 3 | Group #1: 1 |

Specifically, in step 210, in the first configuration information, the reference signal sending and CSI feedback period indication information may be: a sending period and a CSI feedback period of one or more reference signal ports, a sending period and a CSI feedback period of one or more reference signal resources, a sending period and a CSI feedback period of one or more resource sets, a sending period and a CSI feedback period of one or more resource settings, or any combination of the foregoing several manners.

Specifically, the reference signal sending and CSI feedback period indication information may be a quantity of timeslots, a timeslot index, a quantity of OFDM symbols, a quantity of transmission time intervals (TTI), a quantity of transmission time units (TTU), an absolute time value, or a time value obtained through table lookup. For example, in Table 1, a period index may identify a feedback period. The absolute time may be a microsecond (μs), a millisecond (ms), or a second (s), for example, may be 2 ms or 4 ms.

TABLE 1

| Period index | CSI feedback period |
| --- | --- |
| 1 | $T_1$ |
| 2 | $T_2$ |
| 3 | $T_3$ |
| ... | ... |
| N | $T_N$ |

Specifically, in step 210, in the first configuration information, the reference signal activation or deactivation indication information means that a network device configures a plurality of reference signals, but a terminal device may use only one or several reference signals. In this case, the network device may deactivate unused reference signal resources. The network device may indicate, to the terminal device by using an index or a bitmap, resource sets or resources that are deactivated or activated.

For example, when an index indication manner is used, the index indication information may indicate resource sets, resources, or reference signal ports that are deactivated or activated. For example, the indication information may include one or more indexes, and an index value may be a combination relationship of a plurality of indexes {a resource setting index, a resource set index, a resource index, and a port index}. In an example of eight resource sets and three resources in each resource set, to indicate that four resource sets are invalid resources, and four resource sets are valid resources, 4×3 bits, namely, 12 bits are required.

For example, when a bitmap indication manner is used, as shown in FIG. 5, in an example of eight resource sets and three resources in each resource set, two levels of bitmap are required for indication, as shown in FIG. 6. 10011001 indicates that the first, fourth, fifth, and eighth resource sets are valid resources, and the second, third, sixth, and seventh resource sets are invalid resources. Valid resources in the first, fourth, fifth, and eighth resource sets need to be further indicated. For example, the first and third resources are valid and the second resource is invalid in the first resource set; the third resource is valid, and the first and second resources are invalid in the fourth resource set; all resources are valid in the fifth resource set; the first and third resources are valid and the second resource is invalid in the eighth resource set.

Specifically, in step 210, in the first configuration information, the sending and feedback time offset information of the reference signal may be: a sending and feedback time offset of one or more reference signal ports, a sending and feedback time offset of one or more reference signals, a sending and feedback time offset of one or more resource sets, a sending and feedback time offset of one or more resource settings, and any combination of the foregoing four manners.

Further, the "sending time offset" is used to indicate a time interval between a configuration moment and an RS sending moment, and the "feedback time offset" is used to indicate a time interval between a configuration moment and a feedback moment. The time interval may be specifically a quantity of OFDM symbols, a timeslot, a quantity of TTIs, an absolute time, a time value Ti-TN obtained through table lookup or a formula, or a time offset index, as shown in Table 2. The absolute time may be a microsecond (μs), a millisecond (ms), or a second (s), for example, may be 2 ms or 4 ms.

TABLE 2

| Time offset index | Time offset |
| --- | --- |
| 1 | $T_1$ |
| 2 | $T_2$ |
| 3 | $T_3$ |
| ... | ... |
| N | $T_N$ |

It should be noted that a correspondence between the time offset index and the time offset shown in Table 2 is only an example, and Table 2 does not constitute a limitation on this embodiment of the present invention. When the reference signal sending and feedback time offset indication information is information about a time offset index, a corresponding time offset may be determined based on a preset correspondence between the time offset index and the time offset.

Specifically, in step 210, in the first configuration information, the reference signal function indication information is used to indicate a function or a purpose of the reference signal, for example, interference measurement, channel estimation, or beam management.

Further, there are two possible implementations. In a first implementation, a purpose of the reference signal is indicated in a bitmap manner. In an example of four reference signal resources, 1100 indicates that the first two resources are used for channel estimation, and the latter two resources are used for interference measurement. 1000 indicates that the first resource is used for channel estimation, and the latter three resources are used for interference measurement. 0011 indicates that the first two resources are used for interference measurement, and the latter two resources are used for channel estimation. By analogy, details are not described herein again.

In a second implementation, a power class is newly added to an existing power class table to identify a function or a purpose of the reference signal. For example, when the power is set to 0 or null, the RS resource is used for interference measurement. When the power is set to a non-zero value, the RS resource is used for CSI measurement.

Specifically, in step 210, in the first configuration information, the beam sweeping method indication information is used to indicate a beam sweeping method corresponding to the reference signal. The beam sweeping type is used to indicate sweeping manners of the network device and the terminal device. As specified in the current standard, three downlink sweeping modes and three uplink sweeping modes, namely, P1/P2/P3 and U1/U2/U3 respectively are agreed in the standard. For example, for downlink pilot configuration, there may be two bits in a beam sweeping type field. For example, 01 indicates sweeping in a P2 manner. For meanings of P1, P2, P3, U1, U2, and U3, refer to a definition in the standard, and details are not described herein.

Optionally, the beam sweeping type may be carried in a resource set, a resource, a resource setting, a reporting setting, or a link. For example, for downlink pilot configuration, a field of a sweeping type may be named, and a length of the field is 2 bits. 00 indicates that a beam sweeping manner is a procedure 2 (procedure 2, P2), and 01 indicates that a beam sweeping manner is a procedure 3 (P3). For another example, for uplink pilot configuration, 00 indicates that a beam sweeping manner is uplink 2 (U2), and 01 indicates that a beam sweeping manner is uplink 3 (U3). For descriptions of P1, P2, P3, U1, U2, and U3, refer to the description in the standard, and details are not described herein.

Specifically, in this embodiment of the present invention, a beam sweeping method may be indicated in an implicit manner. For example, in a specific implementation, a beam sweeping method or type is implicitly indicated by using index information indicating a resource setting or a resource set. For example, in the following Table 3 or Table 4:

TABLE 3

| Beam sweeping method defined in the standard | Resource set index |
|---|---|
| P2 | Resource set index 0 {resource set #0} |
| P3 | Resource set index 1 {resource set #1} |

TABLE 4

| Beam sweeping method defined in the standard | Resource setting index |
|---|---|
| P2 | Resource setting index 0 {resource setting #0} |
| P3 | Resource setting index 1 {resource setting #1} |

Information about a mapping relationship between the beam sweeping type and the resource setting or the resource set in Table 3 or Table 4 may be sent to the terminal device by using RRC signaling or MAC-CE or DCI signaling, or may be prestored or preconfigured in the base station and the terminal device.

It should be understood that in a semi-persistent or aperiodic beam management process, the base station configures corresponding resource set index information or resource setting index information for the terminal device, and the terminal device may obtain a corresponding beam sweeping method based on the resource set index information or the resource setting index information. The resource set index information may include one or more resource set indexes, so as to implement joint beam management in different beam sweeping processes. In addition, time relationships corresponding to different beam sweeping types may be determined by a location relationship in index information. For example, as shown in Table 3, when configuration information indicated by the base station is {resource set #1, resource set #0}, the terminal device first completes beam sweeping based on P3, and then completes beam sweeping based on P2. A time difference between the two beam sweeping processes may be configured by the base station for the terminal device, or may be a default value defined in the standard.

It should be understood that the base station configures corresponding resource set index information or resource setting index information for the terminal device, and the terminal device may obtain the corresponding resource setting or resource set configuration information based on corresponding beam sweeping indication information. The beam sweeping indication information may include one or more beam sweeping methods, so as to implement joint beam management in different beam sweeping processes. In addition, time relationships corresponding to different beam sweeping types may be determined by a location relationship in the beam sweeping indication information. For example, as shown in Table 3, when the configuration information indicated by the base station is {P-3, P-2}, the terminal device first completes beam sweeping based on P3, and then completes beam sweeping based on P2. A time difference between the two beam sweeping processes may be configured by the base station for the terminal device, or may be a default value defined in the standard.

It should be understood that the foregoing tables are merely examples, and an implementation process may include a combination of a plurality of beam sweeping methods, for example, P1+P2 and P1+U1. Details are not described herein.

Specifically, in step 230, the terminal device receives, by using the layer 1 or layer 2 signaling, the first configuration information from the base station, so as to obtain the specific information in the first configuration information described above.

Before step 230, the terminal device should further receive the second configuration information from the network device, to obtain specific information in the second configuration information described above.

The performing measurement and feedback based on the first configuration information and the second configuration information specifically includes:

that the receive side performs measurement based on the first configuration information and the second configuration information specifically includes:

a. determining a receive beam based on the receive beam indication information;

b. determining a sending period of the RS based on the reference signal RS sending and channel state information CSI feedback period indication information;

c. determining, based on the RS activation or deactivation indication information, available RS resources;

d. determining time-frequency information of the RS based on the RS sending and CSI feedback time offset indication information;

e. performing measurement based on the reference signal function information;

f. determining a beam sweeping method based on the beam sweeping method indication information; and g. determining a reporting setting based on the information about a relationship between the resource setting and the reporting setting indicated in the link, and feeding back the measurement result based on the reporting setting. For example, in the CSI reporting setting, the terminal device is instructed to feed back information such as a CSI-RS resource indicator (CRI), a precoding matrix indicator (PMI), a codebook configuration, a rank indicator (RI), or a channel quality indicator (CQI). The terminal device determines corresponding values through measurement, and feeds back these values to the network device.

It should be noted that the foregoing steps are not performed in sequence, and may be performed at the same time, or may be performed in the foregoing specified sequence. This is not limited in the present invention.

In the future 5G standard, RS measurement may be unified with beam management (BM). In this embodiment of the present invention, if the terminal device needs to feed back beam pair indication information, the indication information may be represented in one of or a combination of any two or more of the following manners:

a beam index and corresponding beam grouping information. The beam index is a combination of {a resource set index and a resource index} or {a resource set index, a resource index, and a port index}, or a combination of {a resource set index, a resource index, a port index, and a symbol index}.

Alternatively, the beam index and the corresponding beam grouping information are fed back in a bitmap manner.

For example, the beam pair information is indicated by using a resource set index and a resource index, or the beam pair information is indicated by using a resource set index, a resource index, and a port index, or the beam pair information is indicated by using a resource set index, a resource index, a port index, and a symbol index.

In addition, when the resource setting is used for beam management (BM), the resource setting may be referred to as a beam management resource setting, a reporting setting may be referred to as a beam management reporting setting, and a link may be referred to as a beam management link. A quantity of resource sets in the beam management resource setting is equal to a quantity of time units (TU) in a beam sweeping period. For a definition of the TU, refer to the description in the standard.

Details are not described herein.

Further, a plurality of beam management reporting settings may be associated with a same beam management resource setting.

Further, a plurality of beam management resource settings may be associated with a same beam management reporting setting.

Optionally, for some parameters, different resource sets in a same beam management resource setting may be set to a same value. These parameters may be a quantity of ports and a time-domain behavior.

A plurality of RS resources may be configured for beam management, and each RS resource is corresponding to one beam. Therefore, the beam management reporting setting may be a CSI RS resource set index, a CSI RS resource index, an RS reception power (RSRP), or a port index.

The solution provided in this embodiment of the present invention provides a technical solution for channel measurement and feedback when a narrow beam technology is used in a high-frequency band.

Embodiment 2

Figure 3:
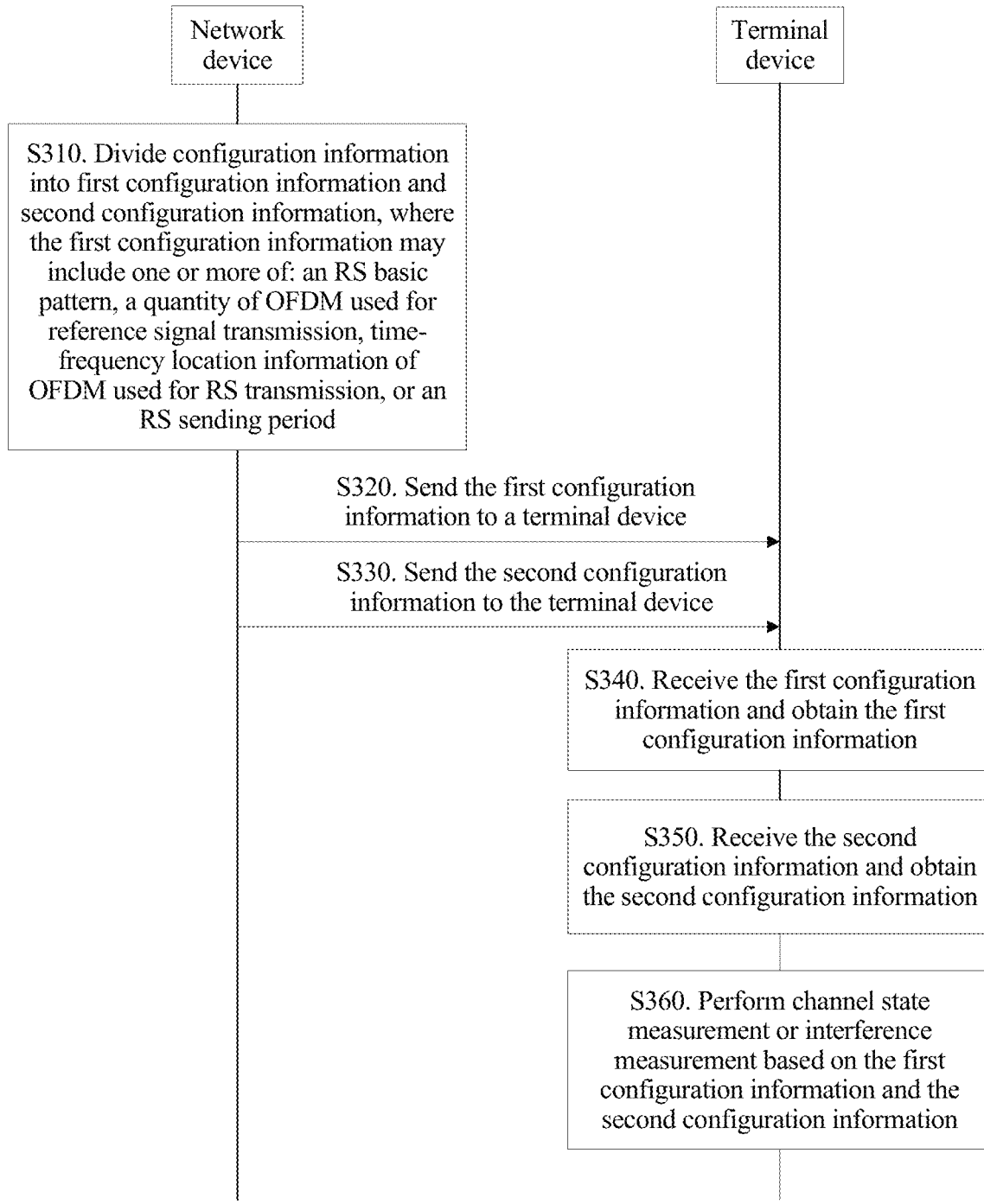
FIG. 3 is a schematic flowchart of an information configuration method according to an embodiment of this application.

FIG. 3 shows a schematic flowchart of an information configuration method 300 according to an embodiment of this application. In FIG. 3, a network device may be the network device in FIG. 1, and a terminal device may be the terminal device in FIG. 1.

S310. Divide configuration information into first configuration information and second configuration information.

S320. Send the first configuration information to the terminal device by using layer 2 signaling.

S330. Send the second configuration information to the terminal device by using layer 1 signaling or the layer 2 signaling.

S340. Receive the first configuration information from the network device, and obtain the first configuration information.

S350. Receive the second configuration information from the network device, and obtain the second configuration information.

S360. Perform channel measurement, interference measurement, or beam management based on the first configuration information and the second configuration information.

It should be understood that the execution sequence of step 320 and step 330 may be adjusted, or the first configuration information and the second configuration information may be simultaneously sent. This is not limited by step numbers.

Optionally, the first configuration information may be a parameter with a relatively slow time variation.

Optionally, the second configuration information may be a parameter with a relatively fast time variation.

Specifically, the first configuration information may include one or more of: an RS basic pattern (basic pattern or basic subset pattern), a quantity of OFDM used for reference signal transmission, time-frequency location information of OFDM used for RS transmission, or an RS sending period. A quantity of OFDM used for reference signal transmission is a maximum quantity of OFDM symbols for RS transmission that can be carried by a cell in which the terminal is located or a transmission receiving point TRP, and the time-frequency location information of OFDM used for RS transmission is a time-frequency location of an OFDM symbol used for RS transmission in a cell in which the terminal device is located or a TRP.

Specifically, the RS basic pattern includes at least one of the following information:

a quantity of reference signal ports configured on an orthogonal frequency division multiplexing (OFDM) symbol, RS time-frequency domain mapping information or location information, an offset or location information that is of the first OFDM symbol used for RS transmission and on a frame, a subframe, or a timeslot, and a maximum value or a maximum quantity of OFDM symbols used for RS transmission.

The RS basic pattern is relatively stable and has a short delay and high tolerance. Therefore, in this embodiment of the present invention, the RS basic pattern is transmitted to the terminal device by using RRC signaling, and signaling overheads can be reduced.

In a possible implementation, the layer 2 signaling may be RRC signaling.

Specifically, the RRC signaling may include one or more newly-added fields, and the first configuration information is carried on the one or more newly-added fields.

Specifically, the second configuration information includes at least one of the following information:

one or more resource settings (resource setting), one or more reporting settings (reporting setting), and a link (link).

Each resource setting is corresponding to one resource setting index that is used to uniquely identify the resource setting.

Each resource setting includes one or more resource sets, and each resource set is corresponding to one resource set index that is used to uniquely identify the resource set.

Each resource set further includes one or more RS resources, and each RS resource is corresponding to one resource index that is used to uniquely identify the RS resource.

Each RS resource further includes one or more of the following information:

time-frequency location information of each RS, an RS sending time-domain characteristic, RS function indication information, RS receive beam information of the terminal device, RS sending and RS feedback period indication information, RS deactivation or activation indication information, RS sending and feedback time offset indication information, and beam sweeping method indication information.

Specifically, in this embodiment of the present invention, a beam sweeping method or type may be indicated in an implicit manner. For example, in a specific implementation, a beam sweeping method or type is implicitly indicated by using index information indicating a resource setting or a resource set. For example, in the following Table 5 or Table 6:

TABLE 5

| Beam sweeping method or type defined in the standard | Resource set index |
|---|---|
| P2 | Resource set index 0 {resource set #0} |
| P3 | Resource set index 1 {resource set #1} |

TABLE 6

| Beam sweeping method or type defined in the standard | Resource setting index |
|---|---|
| P2 | Resource setting index 0 {resource setting #0} |
| P3 | Resource setting index 1 {resource setting #1} |

Information about a mapping relationship between the beam sweeping type and the resource setting or the resource set in Table 5 or Table 6 may be sent to the terminal device by using RRC signaling or MAC-CE or DCI signaling, or may be prestored or preconfigured in the base station and the terminal device.

It should be understood that in a semi-persistent or aperiodic beam management process, the base station configures corresponding resource set index information or resource setting index information for the terminal device, and the terminal device may obtain a corresponding beam sweeping method based on the resource set index information or the resource setting index information. The resource set index information may include one or more resource set indexes, so as to implement joint beam management in different beam sweeping processes. In addition, time relationships corresponding to different beam sweeping types may be determined by a location relationship in index information. For example, as shown in Table 5, when configuration information indicated by the base station is {resource set #1, resource set #0}, the terminal device first completes beam sweeping based on P3, and then completes beam sweeping based on P2. A time difference between the two beam sweeping processes may be configured by the base station for the terminal device, or may be a default value defined in the standard.

It should be understood that the base station configures corresponding resource set index information or resource setting index information for the terminal device, and the terminal device may obtain the corresponding resource setting or resource set configuration information based on corresponding beam sweeping indication information. The beam sweeping indication information may include one or more beam sweeping methods, so as to implement joint beam management in different beam sweeping processes. In addition, time relationships corresponding to different beam sweeping types may be determined by a location relationship in the beam sweeping indication information. For example, as shown in Table 5, when the configuration information indicated by the base station is {P-3, P-2}, the terminal device first completes beam sweeping based on P3, and then completes beam sweeping based on P2. A time difference between the two beam sweeping processes may be configured by the base station for the terminal device, or may be a default value defined in the standard.

It should be understood that the foregoing tables are merely examples, and an implementation process may include a combination of a plurality of beam sweeping methods, for example, P1+P2 and P1+U1. Details are not described herein.

Each reporting setting includes one or more of the following information:
a reporting setting index that is used to uniquely identify a reporting setting, a CSI measurement and reporting time-domain characteristic, a CSI measurement and reporting frequency-domain characteristic, a CSI reporting type or content, and beam sweeping method indication information.

The link includes one or more of the following information:
a resource setting index, a reporting setting index, a quantity to be measured (quantity to be measured), and beam sweeping method indication information.

Specific descriptions of the RS receive beam information of the terminal device, the RS sending and RS feedback period indication information, the RS deactivation or activation indication information, the RS sending and feedback time offset indication information, and the beam sweeping method indication information are the same as descriptions in Embodiment 1, and are not described herein again.

Specifically, the RS sending time-domain characteristic may be periodic, aperiodic, and semi-persistent. For example, when a periodic RS time-domain characteristic is configured, a specific value of a period should also be configured, for example, a period of 50 ms and a period of 10 ms, as shown in FIG. 4.

Specifically, the CSI measurement and feedback frequency-domain characteristic may be broadband, narrowband, or some bandwidths. For example, which subbands are used for feedback in frequency domain.

Specifically, the CSI feedback type or content may be an RS resource indicator, a precoding matrix indicator (PMI), a codebook configuration, a rank indicator (RI), or a channel quality indicator (CQI).

Optionally, the second configuration information may be sent to the terminal device by using the MAC CE or the DCI. One or more fields may be newly added to the MAC CE or the DCI to carry second measurement information.

Further, the RS function indication information is used to indicate a function of a CSI-RS. For example, in a possible implementation, when a value of the field is 0 or null, the CSI-RS resource is used for interference measurement. When a value of the field is NZP CRI-RS configuration, the CSI-RS resource is used for channel estimation.

Optionally, the RS is a CSI-RS. The CSI-RS is a downlink reference signal used when channel state measurement, for example, channel quality information (CQI), a precoding matrix indicator (PMI), a rank indicator (RI), or beam management is performed. A CSI-RS measurement resource is a time-frequency resource configured by the base station for a CSI-RS, and is used by the base station to perform beam alignment with the terminal device. In a beam alignment process, the base station can send the CSI-RS on the CSI-RS measurement resource, and the terminal device can receive and measure, on the CSI-RS measurement resource, the CSI-RS sent by the base station.

Optionally, the first configuration information may be sent to the terminal device by using a random access response message or a physical downlink shared channel (PDSCH) after the terminal device completes random access.

Optionally, the RS is a sounding reference signal (SRS). The SRS is an uplink reference signal used for channel estimation or beam management. An SRS measurement resource is a time-frequency resource configured by the base station for an SRS, and is used by the base station to perform beam alignment with the terminal device. In a beam alignment process, the terminal device can send the SRS on the SRS measurement resource, and the base station can receive and measure, on the SRS measurement resource, the SRS sent by the terminal device.

Optionally, the first configuration information may be sent to the terminal device by using a random access response message or a physical downlink shared channel (PDSCH) after the terminal device completes random access.

Specifically, in step 340, the terminal device receives the layer 2 signaling and obtains the first configuration information. The first configuration information is the same as that described above, and details are not described herein again.

Specifically, in step 350, the terminal device receives the layer 1 or layer 2 signaling and obtains the second configuration information. The second configuration information is the same as that described above, and details are not described herein again.

Further, the performing channel state measurement or interference measurement based on the first configuration information and the second configuration information in step 360 specifically includes the following steps:

a. Determine RS resource time-frequency domain location information (time-frequency information of an RE occupied by the RS) and an RS signal sending time based on the RS basic pattern, one or more RS resource settings, and one or more reporting settings, and further detect the reference signal.

b. Determine an RS resource setting function. For example, when the CSI-RS is used for interference measurement, a receiving energy value is measured and an interference estimation value is obtained at a corresponding time point and at a corresponding RE location; and when the CSI-RS is used for channel estimation, channel estimation is performed and a channel matrix is calculated at a corresponding time point and at a corresponding RE location.

c. Feed back corresponding information based on CSI reporting setting. For example, in the CSI reporting setting, the terminal device is instructed to feed back information such as a CSI-RS resource indicator (CRI), a precoding matrix indicator (PMI), a codebook configuration, a rank indicator (RI), or a channel quality indicator (CQI). After obtaining the corresponding information through measurement, the terminal device feeds back the information to the network device.

Further, in the future 5G standard, RS measurement may be unified with beam management (BM). In beam management, the terminal device needs to feed back one or more pieces of beam pair information, and a beam pair includes a transmit beam and a receive beam.

In this embodiment of the present invention, if the terminal device needs to feed back beam pair indication information, the indication information may be represented in one of or a combination of any two or more of the following manners:

a beam index and corresponding beam grouping information. The beam index is a combination of {a resource set index and a resource index} or {a resource set index, a resource index, and a port index}, or a combination of {a resource set index, a resource index, a port index, and a symbol index}.

Alternatively, the beam index and the corresponding beam grouping information are fed back in a bitmap manner.

For example, the beam pair information is indicated by using a resource set index and a resource index, or the beam pair information is indicated by using a resource set index, a resource index, and a port index, or the beam pair information is indicated by using a resource set index, a resource index, a port index, and a symbol index.

In addition, when the resource setting is used for beam management (BM), the resource setting may be referred to as a beam management resource setting, a reporting setting may be referred to as a beam management reporting setting, and a link may be referred to as a beam management link. A quantity of resource sets in the beam management resource setting is equal to a quantity of time units (TU) in a beam sweeping period. For a definition of the TU, refer to the description in the standard. Details are not described herein.

Further, a plurality of beam management reporting settings may be associated with a same beam management resource setting.

Further, a plurality of beam management resource settings may be associated with a same beam management reporting setting.

Optionally, for some parameters, different resource sets in a same beam management resource setting may be set to a same value. These parameters may be a quantity of ports and a time-domain behavior.

A plurality of RS resources may be configured for beam management, and each RS resource is corresponding to one beam. Therefore, the beam management reporting setting may be a CSI RS resource set index, a CSI RS resource index, an RS reception power (RSRP), or a port index.

That the receive side performs measurement based on the first configuration information and the second configuration information specifically includes:

a. determining a receive beam based on the receive beam indication information;

b. determining a beam sweeping method based on the beam sweeping method indication information;

c. determining reference signal time-frequency information based on RS resource information;

d. performing measurement based on the reference signal function information; and e. determining a reporting setting based on the information about a relationship between the resource setting and the reporting setting indicated in the link, and feeding back the measurement result based on the reporting setting.

The determining a beam sweeping method based on the beam sweeping method indication information in step b specifically includes:

determining the beam sweeping method based on the resource setting index information or the resource set index information.

This embodiment of the present invention provides a solution for reference signal configuration and measurement when a narrow beam is used in a high frequency scenario.

Embodiment 3

Figure 7:
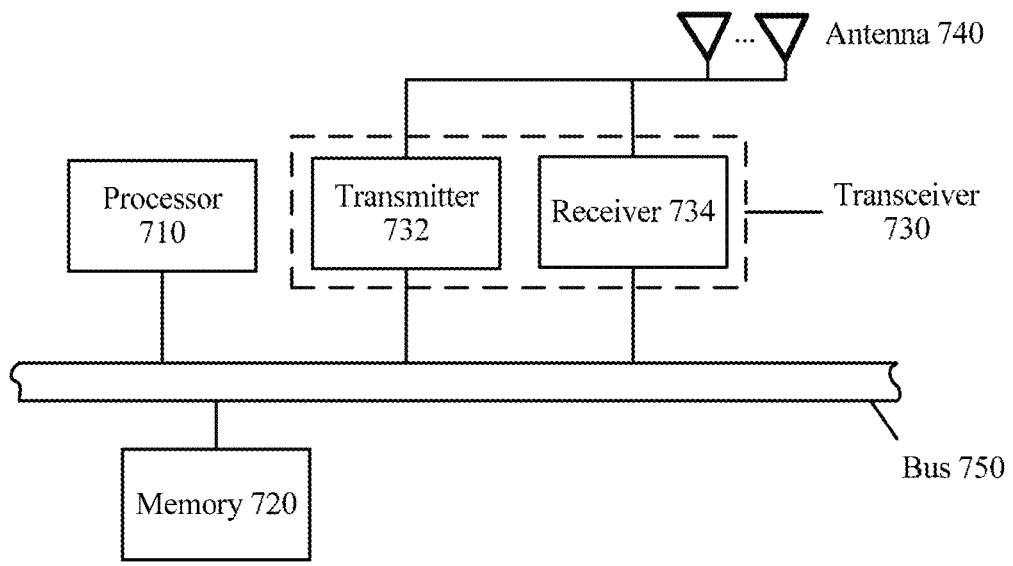
FIG. 7 is a schematic block diagram of a network device according to an embodiment of this application.

FIG. 7 provides a schematic diagram of a network device, and the network device may be applied to a system shown in FIG. 1. The network device 700 includes a processor 710, a memory 720, a transceiver 730, an antenna 740, and a bus 750.

Specifically, the processor 710 controls an operation of the network device 700, for example, controls the network device 700 to perform S210 and S310. For details, refer to the description in the method embodiments, and details are not described herein again. The processor may be a general purpose processor, a digital signal processor, an application-specific integrated circuit, a field-programmable gate array, or another programmable logic component.

The transceiver 730 is configured to communicate with the terminal device, for example, may perform S220, S320, and S330. For details, refer to the description in the method embodiments, and details are not described herein again. The transceiver 730 includes a transmitter 732 and a receiver 734. The transmitter 732 is configured to transmit a signal, and the receiver 734 is configured to receive a signal. There may be one or more antennas 740.

Components of the network device 700 are coupled together by using the bus 750. In addition to a data bus, the bus 750 further includes a power bus, a control bus, and a status signal bus. However, for clarity of description, various buses are marked as the bus 750 in the figure. It should be noted that the foregoing descriptions of the network device structure may be applied to the method embodiments in this application.

The memory 720 may include a read-only memory (ROM for short), a random access memory (RAM for short), or another type of dynamic storage device that may store information and an instruction, or may be a disk memory. The memory 720 may be configured to store an instruction for implementing a related method provided in the embodiments of this application. It may be understood that an executable instruction is programmed or loaded to at least one of the processor 710, a cache, or a long-term memory of the network device 700.

In a specific embodiment, the memory is configured to store computer executable program code. When the program code includes an instruction, and when the processor executes the instruction, the instruction enables the network device to perform an operation in the method embodiments. For details, refer to the description in the method embodiments, and details are not described herein again.

Embodiment 4

Figure 8:
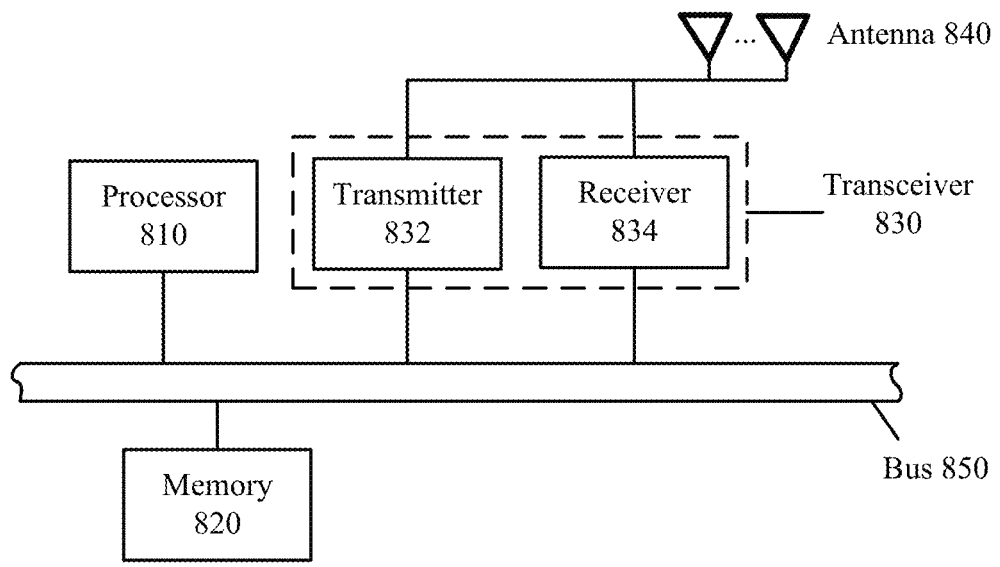
FIG. 8 is a schematic block diagram of an information indication terminal device according to an embodiment of this application.

FIG. 8 is a schematic block diagram of an information indication terminal device 800 according to an embodiment of this application. The terminal device may be applied to the system shown in FIG. 1. The terminal device 800 includes a processor 810, a memory 820, a transceiver 830, an antenna 840, and a bus 850.

Specifically, the processor 810 controls an operation of the terminal device 800, for example, controls the terminal device 800 to perform S240 and S360. For details, refer to the description in the method embodiments, and details are not described herein again. The processor may be a general purpose processor, a digital signal processor, an application-specific integrated circuit, a field-programmable gate array, or another programmable logic component.

The transceiver 830 is configured to communicate with the terminal device, for example, may perform S230, S340, and S350. For details, refer to the description in the method embodiments, and details are not described herein again. The transceiver 830 includes a transmitter 832 and a receiver 834. The transmitter 832 is configured to transmit a signal, and the receiver 834 is configured to receive a signal. There may be one or more antennas 840. The terminal device 800 may further include a user interface 860, such as a keyboard, a microphone, a loudspeaker, and/or a touchscreen. The user interface 860 may transfer content and a control operation to the terminal device 800.

Components of the terminal device 800 are coupled together by using the bus 850. In addition to a data bus, the bus system 850 further includes a power bus, a control bus, and a status signal bus. However, for clarity of description, various buses are marked as the bus system 850 in the figure. It should be noted that the foregoing descriptions of the terminal device structure may be applied to the embodiments in this application.

The memory 820 may include a read-only memory (ROM for short), a random access memory (RAM for short), or another type of dynamic storage device that may store information and an instruction, or may be a disk memory. The memory 820 may be configured to store an instruction for implementing a related method provided in the embodiments of this application. It may be understood that an executable instruction is programmed or loaded to at least one of the processor 810, a cache, or a long-term memory of the terminal device 800.

In a specific embodiment, the memory is configured to store computer executable program code. When the program code includes an instruction, and when the processor executes the instruction, the instruction enables the terminal device to perform an operation in the method embodiments. For details, refer to the description in the method embodiments, and details are not described herein again.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present invention are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk, (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of the present invention shall be subject to the protection scope of the claims.

The invention claimed is:
1. A network device, comprising:
a memory storing program instructions; and
at least one processor coupled to the memory, wherein the program instructions, when executed by the at least one processor, cause the network device to:
generate first configuration information, wherein the first configuration information comprises at least one of the following information:
receive beam indication information of a terminal device, reference signal (RS) sending and channel state information (CSI) feedback time offset indication information, RS function indication information, or beam sweeping method indication information; and
send the first configuration information to the terminal device by using layer one or layer two signaling;
wherein the receive beam indication information of the terminal device is at least one of a quasi-co-location (QCL) indicator, a resource index, or a synchronization block SS block index, and wherein the receive beam indication information of the terminal device is used to indicate a receive beam of the terminal device;
wherein the RS sending and CSI feedback time offset indication information is used to indicate time offset for sending one or more reference signals (RSs) and time offset for CSI feedback, wherein the time offset for sending one or more RSs is used to indicate a time interval between a configuration moment and a RS sending moment, and wherein the time offset for CSI feedback is used to indicate a time interval between a configuration moment and a CSI feedback moment;
wherein the RS function indication information is used to indicate the RS is used for channel state information measurement interference measurement, or beam management wherein:
when the RS function indication information is a first value, the RS is used for interference measurement (IM);
when the RS function indication information is a second value, the RS is used for channel state measurement; and
when the RS function indication information is a third value, the RS is used for beam management (BM); and wherein the beam sweeping method indication information is resource set information and is used to indicate the beam sweeping method of the terminal device.

2. The network device according to claim 1, wherein the first configuration information further comprises:
RS activation or deactivation indication information, wherein the RS activation or deactivation indication information is used to indicate activation and deactivation information of a resource set; and
RS sending and CSI feedback period indication information, wherein the RS sending and CSI feedback period indication information is used to indicate a sending period and CSI feedback period of a RS resource.

3. The network device according to claim 2, wherein the RS sending and CR feedback period indication information is one of the following information:
a quantity of orthogonal frequency division multiplexing (OFDM) symbols, a quantity of transmission time intervals (TTIs), a quantity of transmission time units (TTUs), number of slots, or a time.

4. The network device according to claim 2, wherein the RS activation or deactivation indication information is a resource set index.

5. The network device according to claim 2, wherein the RS activation or deactivation indication information indicates activation or deactivation of a resource set in a bitmap manner.

6. The network device according to claim 1, wherein the program instructions, when executed by the at least one processor, further cause the network device to:
generate second configuration information, wherein:
the second configuration information comprises at least one of the following information: one or more resource settings, one or more reporting settings, or one or more links;
each link of the one or more links is used to indicate a relationship between a resource setting and a reporting setting;
each resource setting comprises one or more resource sets;
each resource set comprises one or more resources; and
each resource comprises at least one of the following information: resource time-frequency information, resource index information, or a resource sending time-domain characteristic; and
send the second configuration information to the terminal device by using layer one or layer two signaling.

7. The network device according to claim 6, wherein the reporting setting is CSI RS resource index or reference signal reception power (RSRP), and wherein the reporting setting comprises at least one of the following information:
information used to indicate a reporting time-domain characteristic, information used to indicate a reporting frequency-domain granularity, a quantity to be measured, or information used to indicate a reporting type or content.

8. The network device according to claim 1, wherein the RS sending and CSI feedback time offset indication information is one of the following information:
a quantity of OFDM symbols, a quantity of transmission time intervals (TTIs), number of slots, or a time.

9. The network device according to claim 1, wherein the beam sweeping method indication information is scanning type information P2 or P3.

10. A terminal device, comprising:
a memory storing program instructions; and at least one processor coupled to the memory, wherein the program instructions, when executed by the at least one processor, cause the terminal device to:
receive first configuration information from a network device, wherein the first configuration information comprises one or more of the following information:
receive beam indication information of the terminal device, reference signal (RS) sending and channel state information (CSI) feedback time offset indication information, RS function indication information, or beam sweeping method indication information; and
perform measurement and feedback based on the first configuration information;
wherein the receive beam indication information of the terminal device is at least one of a quasi-co-location (QCL) indicator, a resource index, or a synchronization block (SS) block index, and wherein the receive beam indication information of the terminal device is used to indicate a receive beam of the terminal device;
wherein the RS sending and CSI feedback time offset indication information is used to indicate time offset for sending one or more reference signals (RSs) and time offset for CSI feedback, wherein the time offset for sending one or more RSs is used to indicate a time interval between a configuration moment and a RS sending moment, and wherein the time offset for CSI feedback is used to indicate a time interval between a configuration moment and a CSI feedback moment;
wherein the RS function indication information is used to indicate the RS is used for channel state information measurement, interference measurement, or beam management, and wherein:
when the RS function indication information is a first value, the RS is used for interference measurement (IM);
when the RS function indication information is a second value, the RS is used for channel state measurement;
when the RS function indication information is a third value, the RS is used for beam management (BM); and
wherein the beam sweeping method indication information is resource set information and is used to indicate the beam sweeping method of the terminal device.

11. The terminal device according to claim 10, wherein the RS sending and CSI feedback period indication information is one of the following information:
a quantity of orthogonal frequency division multiplexing (OFDM) symbols, a quantity of transmission time intervals (TTIs), a quantity of transmission time units (TTUs), number of slots, or a time.

12. The terminal device according to claim 10, wherein the first configuration information further comprises RS activation or deactivation indication information, and wherein the RS activation or deactivation indication information is
a resource set index.

13. The terminal device according to claim 12, wherein the RS activation or deactivation indication information indicates activation or deactivation of a resource set in a bitmap manner.

14. The terminal device according to claim 10, wherein the RS sending and CSI feedback time offset indication information is one of the following information:
a quantity of OFDM symbols, a quantity of transmission time intervals TTIs, number of slots, or a time.

15. The terminal device according to claim 10, wherein the program instructions, when executed by the at least one processor, further cause the terminal device to:
receive second configuration information from the network device, wherein the second configuration information comprises at least one of the following information: one or more resource settings, one or more reporting settings, or one or more links,
wherein each link of the one or more links is used to indicate a relationship between a resource setting and a reporting setting; and
wherein each resource setting comprises one or more resource sets.

16. The method according to claim 15, wherein each resource set comprises one or more resources, and wherein each resource comprises at least one of the following information:
resource time-frequency information, resource index information, or a resource sending time-domain characteristic.

17. The method according to claim 15, wherein the reporting setting is CSI RS resource index or reference signal reception power (RSRP), and wherein the reporting setting comprises at least one of the following information:
information used to indicate a reporting time-domain characteristic, information used to indicate a reporting frequency-domain granularity, a quantity to be measured, or information used to indicate a reporting type or content.

18. The terminal device according to claim 10, wherein the first configuration information further comprises:
RS activation or deactivation indication information, wherein the RS activation or deactivation indication information is used to indicate activation and deactivation information of a resource set; and
RS sending and CSI feedback period indication information, wherein the RS sending and CSI feedback period indication information is used to indicate a sending period and CSI feedback period of a RS resource.

19. The terminal device according to claim 10, wherein the program instructions, when executed by the at least one processor, further cause the terminal device to:
receive second configuration information, wherein:
the second configuration information comprises at least one of the following information: one or more resource settings, one or more reporting settings, or one or more links;
each link of the one or more links is used to indicate a relationship between a resource setting and a reporting setting;
each resource setting comprises one or more resource sets;
each resource set comprises one or more resources; and
each resource comprises at least one of the following information: resource time-frequency information, resource index information, or a resource sending time-domain characteristic;
receive the second configuration information from the network device by using layer one or layer two signaling.

20. The terminal device according to claim 10, wherein the beam sweeping method indication information is scanning type information P2 or P3.

\* \* \* \* \*